(12) United States Patent
Azzi

(10) Patent No.: US 9,802,491 B2
(45) Date of Patent: Oct. 31, 2017

(54) CONTROL OF REGENERATIVE BRAKING IN AN ELECTRIC OR HYBRID VEHICLE

(71) Applicant: RENAULT S.A.S., Boulogne-Billancourt (FR)

(72) Inventor: Hamid Azzi, Maurepas (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/909,239

(22) PCT Filed: Jul. 4, 2014

(86) PCT No.: PCT/FR2014/051731
§ 371 (c)(1),
(2) Date: Apr. 6, 2016

(87) PCT Pub. No.: WO2015/018993
PCT Pub. Date: Feb. 12, 2015

(65) Prior Publication Data
US 2016/0221449 A1    Aug. 4, 2016

(30) Foreign Application Priority Data
Aug. 6, 2013   (FR) ...................................... 13 57801

(51) Int. Cl.
*G06G 7/00*        (2006.01)
*B60T 8/64*        (2006.01)
(Continued)

(52) U.S. Cl.
CPC ............... *B60L 7/26* (2013.01); *B60L 3/0076* (2013.01); *B60L 7/18* (2013.01); *B60T 1/10* (2013.01);
(Continued)

(58) Field of Classification Search
USPC ............................................ 701/70; 303/152
See application file for complete search history.

(56) References Cited

U.S. PATENT DOCUMENTS 5,915,801 A * 6/1999 Taga ........................ B60K 6/48
                                                       303/152
5,951,118 A * 9/1999 Soejima .................... B60T 8/36
                                                       303/113.1

(Continued)

FOREIGN PATENT DOCUMENTS

DE    10 2007 056359 A1    5/2009
EP       0 754 588 A1       1/1997
JP        2013-132979 A     7/2013

OTHER PUBLICATIONS

International Search Report dated Feb. 27, 2015, in PCT/FR2014/051731 Filed Jul. 4, 2014.
French Search Report dated Apr. 24, 2014 in FR 13 57801 Filed Aug. 6, 2013.

*Primary Examiner* — Tyler Paige
(74) *Attorney, Agent, or Firm* — Oblon, McClelland, Maier & Neustadt, L.L.P.

(57) ABSTRACT

A method controls regenerative braking of a vehicle equipped with regenerative brakes and with a separate braking apparatus. The method is designed to generate a regenerative braking setpoint as a function of a braking request signal coming from a driver pedal of the vehicle, according to a first setpoint generation mode. The method includes receiving a flag signal coming from an active safety system of the vehicle, detecting value changes of the received flag signal, when the received flag signal changes value to take a value corresponding to activation of regulation by the active safety system, incrementing a counter value, and comparing the counter with a threshold. When the counter reaches the threshold, a control signal is formed to end the generation of the regenerative braking setpoint (Continued)

according to the first calculation mode and to impose generation of the regenerative braking setpoint according to a second calculation mode.

9 Claims, 1 Drawing Sheet

(51) Int. Cl.
  *B60L 7/26* (2006.01)
  *B60L 3/00* (2006.01)
  *B60L 7/18* (2006.01)
  *B60W 30/18* (2012.01)
  *B60T 1/10* (2006.01)
  *B60T 13/58* (2006.01)
  *F16D 61/00* (2006.01)
  *B60W 10/08* (2006.01)
  *B60W 10/184* (2012.01)
  *B60W 30/09* (2012.01)
  *B60W 20/14* (2016.01)
  *B60T 7/04* (2006.01)

(52) U.S. Cl.
  CPC ............ *B60T 7/042* (2013.01); *B60T 13/586* (2013.01); *B60W 10/08* (2013.01); *B60W 10/184* (2013.01); *B60W 20/14* (2016.01); *B60W 30/09* (2013.01); *B60W 30/18127* (2013.01); *F16D 61/00* (2013.01); *B60L 2260/42* (2013.01); *B60W 2540/12* (2013.01); *B60Y 2300/89* (2013.01); *Y02T 10/7258* (2013.01); *Y10S 903/947* (2013.01)

(56) References Cited

U.S. PATENT DOCUMENTS

| | | | |
|---|---|---|---|
| 2003/0045989 A1* | 3/2003 | Walenty | B60T 8/17636 701/71 |
| 2005/0269875 A1* | 12/2005 | Maki | B60L 7/26 303/152 |
| 2006/0066146 A1* | 3/2006 | Otomo | B60T 8/26 303/151 |
| 2006/0220453 A1* | 10/2006 | Saito | B60L 7/26 303/152 |
| 2007/0018499 A1 | 1/2007 | Kokubo et al. | |
| 2007/0267915 A1* | 11/2007 | Shimada | B60K 6/44 303/122 |
| 2007/0273204 A1* | 11/2007 | Kodama | B60K 6/48 303/146 |
| 2008/0007116 A1* | 1/2008 | Takahashi | B60T 7/042 303/113.3 |
| 2009/0281704 A1* | 11/2009 | Otake | B60T 7/22 701/96 |
| 2011/0125354 A1 | 5/2011 | Gottwick et al. | |
| 2011/0210604 A1* | 9/2011 | Yamamoto | B60T 7/042 303/3 |
| 2011/0221265 A1 | 9/2011 | Busack et al. | |
| 2012/0031692 A1* | 2/2012 | Koike | B60K 6/48 180/65.25 |
| 2012/0049617 A1* | 3/2012 | Furuyama | B60T 8/1766 303/9.75 |
| 2012/0068529 A1* | 3/2012 | Nakaoka | B60T 8/4081 303/114.1 |
| 2012/0299367 A1* | 11/2012 | Ross | B60T 8/4872 303/3 |
| 2016/0221449 A1* | 8/2016 | Azzi | B60T 1/10 |

* cited by examiner

CONTROL OF REGENERATIVE BRAKING IN AN ELECTRIC OR HYBRID VEHICLE

BACKGROUND

The invention relates to control of the regenerative braking in a vehicle equipped with a first, regenerative, braking means and with a second braking means separate from the first braking means, for example a hydraulic braking means.

The vehicle may, for example, be an electrical or hybrid vehicle.

On a vehicle equipped with at least one electrical traction or propulsion motor, it is possible under certain conditions to use the electric motor as a generator and thus to obtain an electrical braking means. Such a use is advantageous because, being regenerative, it makes it possible to recover some of the kinetic energy of the vehicle in order to recharge the batteries.

In the case of decoupled braking, the vehicle may for example comprise a distribution module ("Torque Blending") arranged in order to distribute an overall braking command, coming from the brake pedal, between an electrical actuator and a hydraulic actuator. The situation is referred to as one with complementary braking setpoints.

According to another example, and particularly in the case of a vehicle with non-decoupled braking, a vehicle may comprise a braking management module ("Torque Manager") arranged in order to generate an electrical braking setpoint as a function of the driver setpoint, for example proportional to this driver setpoint. The electrical braking setpoint is then a supplementary braking setpoint, which is added to the conventional hydraulic braking obtained directly from the brake pedal.

The regenerative braking setpoint, whether it is complementary or supplementary, is formed as a function not only of the driver setpoint coming from a brake pedal, but also as a function of other parameters, one of which is a signal indicating the stability of the vehicle.

Specifically, the electrical braking is only applied to the driving wheels, that is to say to the front wheel or wheels in the case of a front-wheel drive vehicle, or to the rear wheel or wheels in the case of a rear-wheel drive vehicle. The potential for regenerative braking is therefore more limited than braking applied to all the wheels.

This regenerative braking therefore risks causing greater slipping of the wheels in question, or even of causing locking of the wheels when the grip conditions are relatively precarious, for example in the case of a road which is wet or covered with ice or snow.

It is known to deactivate the regenerative braking when an active safety system, for example a system to prevent wheel lock, for example ABS (from the German "Antiblockiersystem"), and/or a system to prevent wheel slip, for example an ESC system ("Electronic Stability Control"), detects a hazardous situation, for example when a flag signal formed by this active safety system changes to 1.

These active safety systems are in communication with one or more sensors capable of providing information about the state of the wheels.

When the flag signal returns to zero, that is to say when the signals coming from the active safety systems correspond to a situation of sufficiently low risk, the regenerative braking is re-enabled.

Thus, Application FR2972411 discloses a flag signal referred to as "stability indicator". However, its design and development complexity (in particular the calculation of the indicator on the basis of setpoints for correction of oversteer, for correction of understeer and for deceleration) make it relatively expensive.

There is a need for regenerative braking control which offers greater safety at lower cost.

BRIEF SUMMARY

A method is provided for controlling regenerative braking of a vehicle equipped with a first, regenerative, braking means and with a second braking means separate from the first braking means, for example a means for braking by friction. A regenerative braking setpoint is generated as a function of a braking request signal coming from a driver pedal, according to a first setpoint generation mode. The method comprises:

reception of a flag signal coming from an active safety system, detection of the value changes of the flag signal, when the received flag signal changes value to take a value corresponding to activation of regulation by the active safety system, incrementation of a counter value, comparison of the counter value with a threshold, and if the counter value reaches said threshold, formation of a control signal so as to end the generation of the regenerative braking setpoint according to the first calculation mode and to impose generation of this regenerative braking setpoint according to a second calculation mode.

The control signal formed in this way may be transmitted to a module for generating a regenerative braking setpoint, for example a distribution module, a braking management module, or the like.

Thus, after a certain number of activations of the regulation by the active safety system have taken place, it is assumed in some way that the grip is precarious and calculation of the regenerative braking setpoint according to a second calculation mode is imposed, so as to limit the regenerative braking.

In one advantageous embodiment, when the regenerative braking setpoint is generated according to the second calculation mode, this setpoint is zero, that is to say there is no longer any regenerative braking.

The active safety system may for example comprise an ABS system, an AYC system ("Active Yaw Control"), an MSR system (from the German "Motor Schlepp Regelung"), an ASR system ("Acceleration Slip Regulation"), an EBD system ("Electronic Brakeforce Distribution"), an ESC system ("Electronic Stability Control"), and/or the like.

In particular, the received flag signal may come from a plurality of active safety systems. For example, provision may be made to apply an OR logic to the various flag signals coming from different respective active safety systems.

Advantageously and without limitation, a time filtering of the flag signal may be provided. Thus, one condition for incrementing the counter is that the flag signal which has changed value remains at the value corresponding to activation of the regulation by the active safety system for a given period of time. The filtering may thus be carried out by means of a state change delay filter. This may make it possible to avoid incrementing the counter when the active safety system imposes regulation for a relatively short period of time. This may make it possible to increment the counter only for activations which have different origins, or in other words to avoid incrementing the counter for activations which have the same origin.

Advantageously and without limitation, a master cylinder pressure signal may be received and this signal may be compared with a pressure threshold, and incrementation of the counter may be prevented when the master cylinder pressure is greater than this pressure threshold. Expressed another way, state changes of the flag signal to a state corresponding to activation of the regulation of the active safety system are taken into account only when the braking imposed by the driver is relatively weak. In fact, the flag signal is capable of indicating regulation, for example ESC regulation, when the braking of the driver is relatively strong, for example during relatively sporty driving. Taking the pressure of the master cylinder into account thus makes it possible to consider only weak braking. It is assumed in some way that, if the active safety system has carried out regulation on relatively weak braking, then the grip is likely to be precarious and the loss of grip is probably of unintentional origin.

Of course, the invention is in no way limited to taking the master cylinder pressure into account. In particular, it is possible to use other estimated or measured parameters making it possible to interpret the driver's intention, in particular a deceleration value of the vehicle.

The invention is not limited by the way in which the counter is reset to 0. For example, provision may be made to reset to 0 at the end of mission or at the start of mission. According to another example, provision may be made to decrement the counter, for example when the braking pressure is greater than a threshold and the flag signal remains in a state corresponding to non-activation of the regulation by the active safety system, and to do so while preventing the counter from decreasing below 0. Thus, if the grip conditions are good enough for the active safety system not to impose regulation even though the braking is relatively strong, then the regenerative braking setpoint may once more be made to be formed according to the first calculation mode.

The invention may find a particularly advantageous application in the case of rear-wheel drive vehicles, because when the regenerative braking is applied to the rear wheels, the stability of the vehicle may be relatively critical. A relatively small steering wheel angle risks leading to the vehicle spinning.

Of course, the invention is not limited to this application and provision may of course be made to use the invention in the case of a front-wheel drive vehicle.

The second braking means may or may not be decoupled from the pedal.

The regenerative braking setpoint may, for example, be complementary to a non-regenerative braking setpoint applied by the second braking means, supplementary in relation to the braking applied by this second braking means, or the like.

A computer program product comprising instructions for carrying out the method steps described above when these instructions are executed by a processor is furthermore provided. This program may, for example, be stored on a memory medium, for example a hard drive, or alternatively it may be downloaded, or the like.

A device is furthermore provided for controlling regenerative braking of a vehicle equipped with a first, regenerative, braking means and with a second braking means separate from the first braking means, which device is designed to generate a regenerative braking setpoint as a function of a braking request signal coming from a driver pedal of the vehicle, according to a first setpoint generation mode, the device comprising:

reception means for receiving a flag signal coming from an active safety system of the vehicle, processing means arranged so as to detect the value changes of the received flag signal, to increment a counter value when the received flag signal changes value to take a value corresponding to activation of regulation by the active safety system, to compare the counter with a threshold and, if the counter reaches said threshold, to form a control signal so as to end the generation of the regenerative braking setpoint according to the first calculation mode and to impose generation of this regenerative braking setpoint according to a second calculation mode.

This device can thus make it possible to carry out the method described above. This device may, for example, comprise or be integrated in a plurality of processors for processing the signal, for example a microcontroller, a microprocessor or the like.

The reception means may for example comprise an input port, an input pin or the like. The processing means may, for example, be a processor core or CPU ("Central Processing Unit") or the like. The device may comprise means for transmitting the control signal to a regenerative braking setpoint generation module, for example an output port, an output pin or the like.

A system for controlling regenerative braking is furthermore provided, comprising a module for generating a regenerative braking setpoint, which is capable of generating a regenerative braking setpoint as a function of a braking request signal coming from a driver pedal of the vehicle, according to a first calculation mode and according to a second calculation mode, and a control device as described above.

The generation module may comprise a braking management module arranged in order to calculate the regenerative braking setpoint value by multiplying a braking value representative of the braking carried out by the second braking means by a coefficient which depends on the calculation mode imposed.

A vehicle, for example a motor vehicle, comprising the control device as described above is furthermore provided.

The vehicle may furthermore comprise a regenerative braking means, for example an electrical actuator, and a non-regenerative braking means, for example a hydraulic actuator.

The invention may find an application in all vehicles which have a torque actuator making it possible to recover energy, that is to say in particular electrical or hybrid vehicles, as well as internal combustion vehicles equipped with an alternator, for example a combined alternator-starter allowing a large braking torque.

BRIEF DESCRIPTION OF THE DRAWINGS

The invention will be understood more clearly with reference to the figures, which illustrate nonlimiting embodiments.

DETAILED DESCRIPTION

Identical references may be used from one figure to the other in order to denote elements which are identical or similar in their form or in their function.

Figure 1:
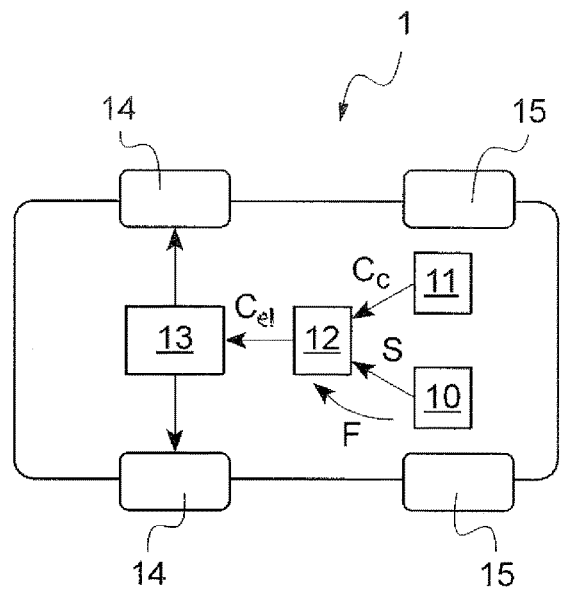
FIG. 1 shows an example of a vehicle according to one embodiment of the invention.

Referring to FIG. 1, an electrical or hybrid vehicle comprises wheels 14, 15 and an electric motor 13 capable of driving the rear wheels 14 in motion or of braking these rear wheels 14 so as to recharge a battery (not represented).

A module 12 for generating a regenerative braking setpoint, for example an electrical braking setpoint $C_{el}$, makes it possible to generate this setpoint value $C_{el}$ according to a first calculation mode, as a function of a driver setpoint value $C_c$ coming from a driver request calculation module 11 or DRC.

This calculation module 11 receives as input an information value regarding the status of the brakes, or BLS ("Brake Info Status") and a master cylinder pressure value, these not being represented in FIG. 1. This module 11 thus generates a setpoint signal $C_c$ on the basis of values coming from sensors.

The module 12 is arranged in order to apply a multiplier coefficient, for example equal to 0.1, to this setpoint value $C_c$, and thus to obtain the electrical braking setpoint value $C_{el}$.

Expressed another way, when this electrical setpoint value $C_{el}$ is obtained according to the first calculation mode, this setpoint value is selected to be equal to 10% of the braking request signal $C_c$ coming from the driver pedal. It is therefore supplementary electrical braking which is added to the hydraulic braking carried out directly on the basis of the brake pedal, without decoupling.

A braking control device 10 receives flag signals coming from various active safety systems (not represented), for example an ABS system, an AYC system and/or the like. When one of these flag signals is equal to 1, the device 10 generates an overall flag signal F which then takes the value 1, and, so long as this signal F is equal to 1, that is to say so long as one of the active safety systems has activated regulation, the electrical braking setpoint $C_{el}$ is zero.

Furthermore, the device 10 is arranged in order to increment a counter each time a flag signal obtained from the various flag signals of the different active safety systems changes to 1. When the counter reaches a threshold, then a signal F coming from the device 10 takes a value corresponding to permanent prevention of the regenerative braking.

Figure 2:
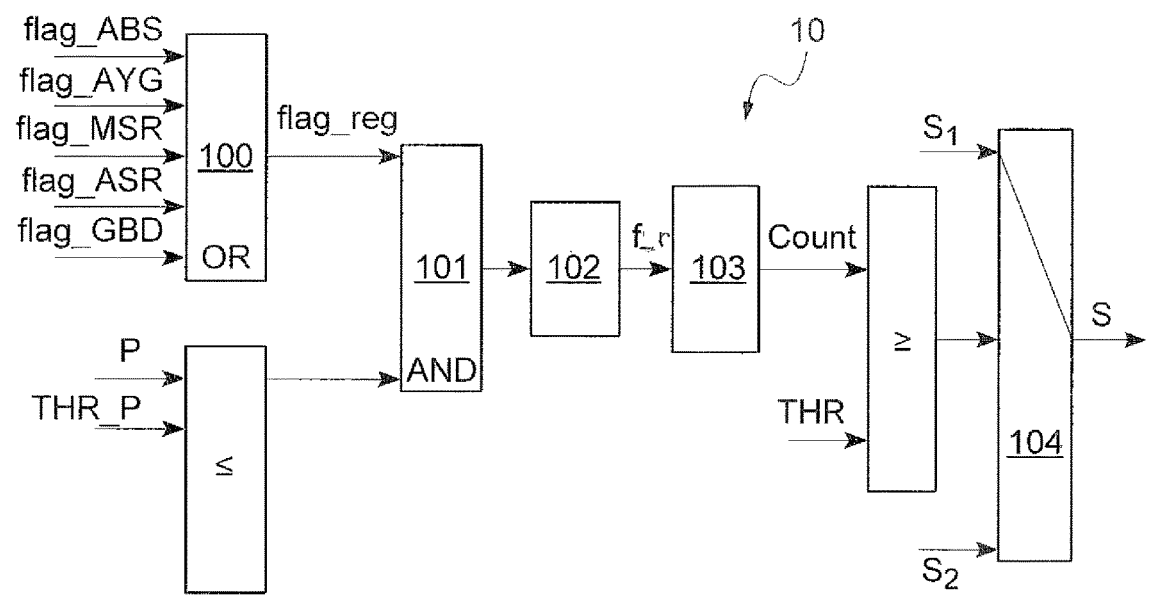
FIG. 2 shows an example of a device for controlling regenerative braking, according to one embodiment of the invention.

FIG. 2 shows a more precise example of a control device according to one embodiment of the invention.

In this embodiment, the device 10 comprises an OR gate 100 receiving as input various flag signals coming from different respective active safety systems, for example a flag flag_ABS coming from an ABS system, a flag flag_AYC coming from an AYC system, a flag flag_MSR coming from an MSR system, a flag flag_ASR coming from an ASR system, a flag flag_EBD coming from an EBD system.

The signal flag_reg coming from this OR gate 100 is received at the input of an AND gate 101. This AND gate furthermore receives a signal which takes a value 1 when a master cylinder pressure value P is less than a master cylinder pressure threshold THR_P. Thus, the signal obtained from the AND gate 101 is equal to 1 only if the master cylinder pressure is less than a threshold, and if the signal flag_reg is equal to 1.

This signal is received in a filtering module 102, in which filtering of the high states is carried out when their duration is too short. Expressed another way, if the signal coming from the AND gate 101 has a value equal to 1 for a time less than a given period of time, then the signal f_r coming from the filtering module 102 remains zero.

The signal f_r coming from this module 102 is received by a counting module 103 arranged in order to be incremented at each leading edge of the incoming signal.

In a preferred embodiment, only the leading edges of the signal f_r lead to incrementation of the signal Count.

In an alternative embodiment, the signal Count is incremented at each leading edge of the signal f_r and each time the signal f_r has a high value for a predetermined period of time. Thus, account is in some way taken of the duration of the high signal periods of the signal f_r. The relative weight of the duration of the high signal periods and the leading edges depend on the value of this predetermined period of time and the respective increments. For example, the choice may be made of a period of time of one minute and increments of 1 in both cases: a high signal lasting 20 seconds will lead to an increment of 1, while a high signal of 70 seconds will lead to an increment of 1+1=2 of the counter. The predetermined period of time may, of course, have a shorter duration, for example one second.

Returning to FIG. 2, the signal Count obtained in this way is then compared with a threshold THR. If the signal Count reaches or exceeds this threshold THR, then a bistable module 104 generating the signal S will make this signal S change from a value $S_1$ to a value $S_2$. The value $S_1$ corresponds to a relatively high regenerative braking limit, while the value $S_2$ corresponds to a relatively low regenerative braking limit, for example 0.

Expressed another way, when the signal S changes from the value $S_1$ to the value $S_2$, the module referenced 12 in FIG. 1 changes from a first calculation mode for the setpoint $C_{el}$, in particular by applying a coefficient to the driver setpoint value $C_c$, to a second calculation mode in which this electrical braking setpoint value $C_{el}$ is zero.

In this embodiment, the counter is reset to 0 only after the device is turned off, that is to say at the end of mission.

Furthermore, the signal F in FIG. 1 which is a stability indicator may be the signal flag_reg coming from the module 100, or the signal coming from the module 101, or alternatively the signal f_r coming from the module 102.

In this embodiment, the vehicle 1 is a front-wheel drive vehicle, the electrical braking being applied only to the rear driving wheels 14, and therefore with a braking potential more limited than braking on all the wheels. There is a greater risk of slipping on the rear wheels, which risks causing locking of the wheels when the grip conditions are relatively precarious.

The method described above, based on counting the long-term activations likely to be associated with the condition of the road, of the active regulation systems, can thus make it possible to diagnose a condition of the road corresponding to precarious grip conditions and to prevent any electrical braking when this diagnosis is made.

Such precarious grip conditions may for example be associated with the presence of ice, snow, or quite simply the fact that the road is wet.

The installed regulation counter can thus supplement the stability indicator known from the prior art.

The invention is not limited to prevention of electrical braking when the counter reaches a threshold. Provision could, for example, be made to allow the electrical braking but with a lower power than when the setpoint $C_{el}$ is generated according to the first calculation mode. For example, the methods employed in the module referenced 12 in FIG. 1 may be identical from one calculation mode to the other, except for the fact that the coefficient applied to the braking setpoint $C_c$ of the driver is less than the second calculation mode. For example, this coefficient may be 10% or 20% in the first calculation mode and only 1 or 2% in the second calculation mode. Expressed another way, the supplementary electrical braking applied is much less after an unsatisfactory state of grip has been diagnosed.

The invention claimed is:

1. A method for controlling regenerative braking of a vehicle equipped with a first, regenerative, braking means, including an electrical actuator to apply the regenerative braking to the vehicle, and with a second braking means separate from the first braking means, which method is designed to generate a regenerative braking setpoint as a function of a braking request signal coming from a driver pedal of the vehicle, according to a first calculation mode, the method comprising:

receiving, via a processor, a flag signal coming from an active safety system of the vehicle;

detecting, via the processor, value changes of the received flag signal;

when the received flag signal changes value to take a value corresponding to activation of regulation by the active safety system, incrementing, via the processor, a counter value;

comparing, via the processor, the counter with a threshold;

when the counter reaches said threshold, forming, via the processor, a control signal so as to end the generation of the regenerative braking setpoint according to the first calculation mode and to impose generation of the regenerative braking setpoint according to a second calculation mode; and applying the regenerative braking setpoint to the electrical actuator to control the regenerative braking of the vehicle.

2. The control method as claimed in claim 1, wherein when the regenerative braking setpoint is generated according to the second calculation mode, the regenerative braking setpoint is zero.

3. The control method as claimed in claim 1, further comprising:

applying a time filtering to the received flag signal prior to the detecting the value changes.

4. The method as claimed in claim 1, further comprising:

receiving a master cylinder pressure signal;

comparing the master cylinder pressure signal with a pressure threshold; and preventing the incrementing of the counter value when the master cylinder pressure is greater than the pressure threshold.

5. A device for controlling regenerative braking of a vehicle equipped with a first, regenerative, braking means and with a second braking means separate from the first braking means, which device is designed to generate a regenerative braking setpoint as a function of a braking request signal coming from a driver pedal of the vehicle, according to a first calculation mode, the device comprising:

reception means for receiving a flag signal coming from an active safety system of the vehicle, and a processor configured to detect value changes of the received flag signal, to increment a counter value when the received flag signal changes value to take a value corresponding to activation of regulation by the active safety system, to compare the counter with a threshold and, when the counter reaches said threshold, to form a control signal so as to end the generation of the regenerative braking setpoint according to the first calculation mode and to impose generation of this regenerative braking setpoint according to a second calculation mode.

6. The device according to claim 5, wherein the processor is a central processing unit.

7. A motor vehicle, comprising:

a first, regenerative, braking system:

a second braking system separate from the first braking system; and a control system for controlling regenerative braking of a vehicle equipped with a first, regenerative, braking means and with a second braking means separate from the first braking means, comprising a module to generate a regenerative braking setpoint as a function of a braking request signal coming from a driver pedal of the vehicle, according to a first calculation mode and according to a second calculation mode, and a control device including reception means for receiving a flag signal coming from an active safety system of the vehicle, and a processor configured to detect value changes of the received flag signal, to increment a counter value when the received flag signal changes value to take a value corresponding to activation of regulation by the active safety system, to compare the counter with a threshold and, when the counter reaches said threshold, to form a control signal so as to end the generation of the regenerative braking setpoint according to the first calculation mode and to impose generation of this regenerative braking setpoint according to a second calculation mode.

8. The motor vehicle as claimed in claim 7, wherein the generation module comprises a braking management module arranged in order to calculate the regenerative braking setpoint value by multiplying a braking value representative of the braking carried out by the second braking means by a coefficient which depends on the calculation mode imposed.

9. The motor vehicle as claimed in claim 7, further comprising:

an electrical actuator to exert braking on rear wheels of the motor vehicle.

* * * * *